US006837499B2

(12) United States Patent
Röhm et al.

(10) Patent No.: US 6,837,499 B2
(45) Date of Patent: Jan. 4, 2005

(54) BALL-BOLT CHUCK

(75) Inventors: Günter Horst Röhm, Sontheim (DE); Johann Taglang, Medlingen (DE)

(73) Assignee: Rohm GmbH, Sontheim (DE)

( * ) Notice: Subject to any disclaimer, the term of this patent is extended or adjusted under 35 U.S.C. 154(b) by 143 days.

(21) Appl. No.: 10/357,635

(22) Filed: Feb. 4, 2003

(65) Prior Publication Data
US 2003/0160400 A1 Aug. 28, 2003

(30) Foreign Application Priority Data
Feb. 22, 2002 (DE) .......................... 102 07 567

(51) Int. Cl.$^7$ ............................................. B23B 31/02
(52) U.S. Cl. ...................... 279/106; 279/119; 279/121; 279/132; 279/141
(58) Field of Search ............................ 279/106, 107, 279/108, 109, 119, 121, 132, 141

(56) References Cited
U.S. PATENT DOCUMENTS

| | | | | |
|---|---|---|---|---|
| 3,099,457 A | * | 7/1963 | Hohwart et al. | 279/106 |
| 3,380,747 A | * | 4/1968 | Hohwart et al. | 279/106 |
| 3,423,098 A | * | 1/1969 | Toth et al. | 279/109 |
| 5,184,833 A | * | 2/1993 | Cross et al. | 279/106 |
| 5,605,343 A | * | 2/1997 | Barbieux | 279/132 |
| 6,036,197 A | * | 3/2000 | Barbieux | 279/132 |
| 6,206,382 B1 | * | 3/2001 | Gonnocci | 279/132 |
| 6,367,816 B1 | * | 4/2002 | Denzinger et al. | 279/141 |
| 6,371,493 B1 | * | 4/2002 | Barbieux | 279/106 |
| 6,375,197 B1 | * | 4/2002 | Barbieux | 279/132 |
| 6,454,278 B1 | * | 9/2002 | Wrobel et al. | 279/130 |

FOREIGN PATENT DOCUMENTS

| | | | | |
|---|---|---|---|---|
| DE | 3322201 | * | 1/1985 | B23B/31/16 |
| JP | 64-58403 | * | 3/1989 | B23B/31/18 |

* cited by examiner

*Primary Examiner*—Daniel W. Howell
(74) *Attorney, Agent, or Firm*—Herbert Dubno; Andrew Wilford

(57) ABSTRACT

A chuck has a chuck body rotatable about a main axis and a plate displaceable axially on the body between an outer position and an inner position. Springs urge the plate into the outer position. A locking element on the body can move between a blocking position preventing displacement of the plate from the outer position into the inner position and a freeing position permitting such displacement. A plurality of jaw holders angularly spaced about the axis are fixed axially on the plate and each have radially displaceable outer and inner ends. A piston axially displaceable in the body has cam formations engaging the jaw-holder inner ends for radially displacing the jaw-holder outer ends on axial displacement of the piston.

18 Claims, 7 Drawing Sheets

BALL-BOLT CHUCK

BACKGROUND OF THE INVENTION

A standard ball-bolt chuck has a chuck body rotatable about a main axis and a plurality of jaw holders angularly spaced about the axis, fixed axially on the chuck body, and each having radially displaceable outer and inner ends. Jaws are bolted to the outer ends. A piston axially displaceable in the body is coupled via cam formations with the jaw-holder inner ends for radially displacing the jaw-holder outer ends on axial displacement of the piston. Thus the piston can shift to move the jaws carried on the holders radially inward or outward, depending on whether the chuck is used for outside or inside holding, to radially grip and hold a workpiece.

Such a chuck can adapt limitedly to an irregularly shaped workpiece and can grip with great radial force. Nonetheless it is still possible for the workpiece to shift on the chuck, in particular axially.

OBJECTS OF THE INVENTION

It is therefore an object of the present invention to provide an improved ball-bolt chuck.

Another object is the provision of such an improved ball-bolt chuck which overcomes the above-given disadvantages, that is which can grip the chuck very solidly, even if desired pressing it axially against an abutment on the chuck.

SUMMARY OF THE INVENTION

A chuck has according to the invention a chuck body rotatable about a main axis and a plate displaceable axially on the body between an outer position and an inner position. Springs urge the plate into the outer position. A locking element on the body can move between a blocking position preventing displacement of the plate from the outer position into the inner position and a freeing position permitting such displacement. A plurality of jaw holders angularly spaced about the axis are fixed axially on the plate and each have radially displaceable outer and inner ends. A piston axially displaceable in the body has cam formations engaging the jaw-holder inner ends for radially displacing the jaw-holder outer ends on axial displacement of the piston.

Thus with this system in the freeing position of the ring the chuck can move the jaws both radially and axially. The spring force is such that when the piston first moves it cams the jaw holders radially inward or outward. Once the jaws seat on the workpiece, further axial movement of the piston shifts the plate and jaw holders axially rearward, normally pressing the workpiece against an abutment on the body. Thus this system solidly clamps the workpiece both against angular movement and axial movement. When the cam ring is in the blocking position, the chuck acts like a standard prior-art chuck with only radial clamping.

The jaw holders are ball bolts tippable about respective secantal axes lying in at least one plane extending perpendicular to the main axis. The cam formations include an angled face formed on each of the jaw-holder inner ends. In addition the plate is provided with axially rearwardly directed posts having rear ends engageable with the locking element. The body formed with respective axially forwardly open passages slidably receiving the posts so that the posts and passages rotationally lock the plate and body together. Thus the plate carrying the jaw holders is angularly coupled to the chuck body, but can move axially relative to it.

Furthermore in accordance with the invention the locking element is a ring rotatable about the main axis on the body and having respective cams engageable with the post rear ends. Thus this ring can be spaced from the front face of the chuck, where chips and the like are generated by a machining operation, keeping it out of harm's way. A latch member displaceable between a latched position prevents angular movement of the ring and an unlatched position permitting such angular movement. This latch member engages the piston in the unlatched position and thereby prevents it from moving axially. Thus in one position it prevents the cam ring from moving, and in the other it prevents the piston from moving, so that during an adjustment operation the plate cannot be shifted.

Each of the posts according to the invention is formed with a transversely projecting formation having an axially forwardly directed face, and each passage has a rearwardly directed face flatly engageable with the respective forwardly directed post face in the outer position of the plate. The passages are each formed with a radially inwardly open groove having a front flank forming the respective rearwardly directed face and each post has a radially outwardly projecting ridge having the respective forwardly directed post face. This structure is extremely compact and capable of withstanding considerable axial stress.

An axially displaceable abutment can vary a force the springs exert axially between the plate and the body. This abutment is a plurality of bolts threaded into the plate and bearing axially on the springs, themselves formed as stacks of Belleville washers.

A respective seat fitted to the plate pivotally supports a center part of each bolt. Each seat is provided with an externally threaded retaining ring holding the respective center part in the seat, and each bolt bears angularly on faces of the respective seat. Similarly each seat bears angularly on respective faces of the plate. The seats are each pivotal about a respective axis parallel to the main axis between two 180° offset positions and a spring-loaded pin is provided for releasably retaining each of the seats in its offset positions.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
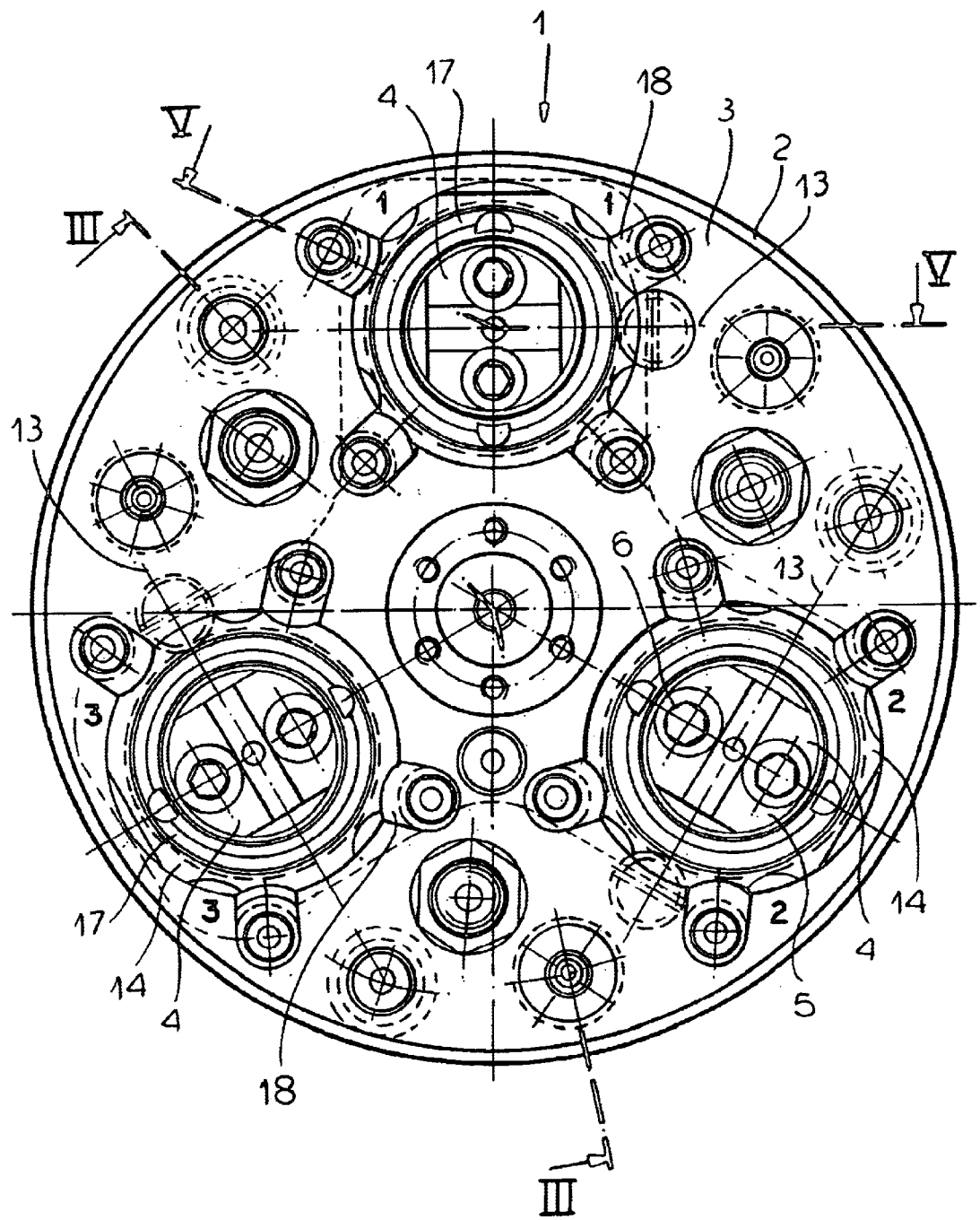
FIG. 1 is a front end view of the chuck according to the invention.
Figure 2:
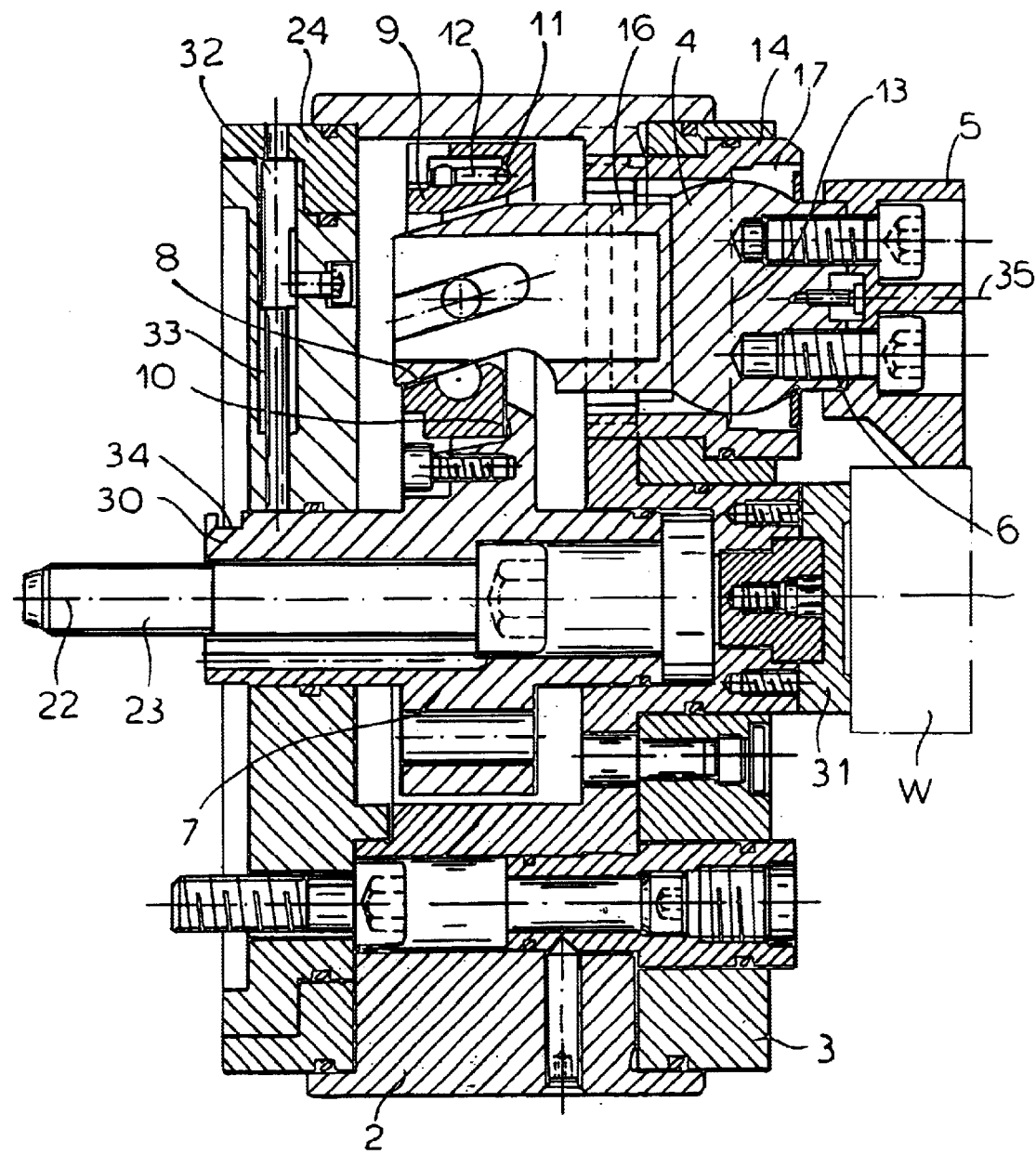
FIG. 2 is an axial section through the chuck set up for outside holding.
Figure 6:
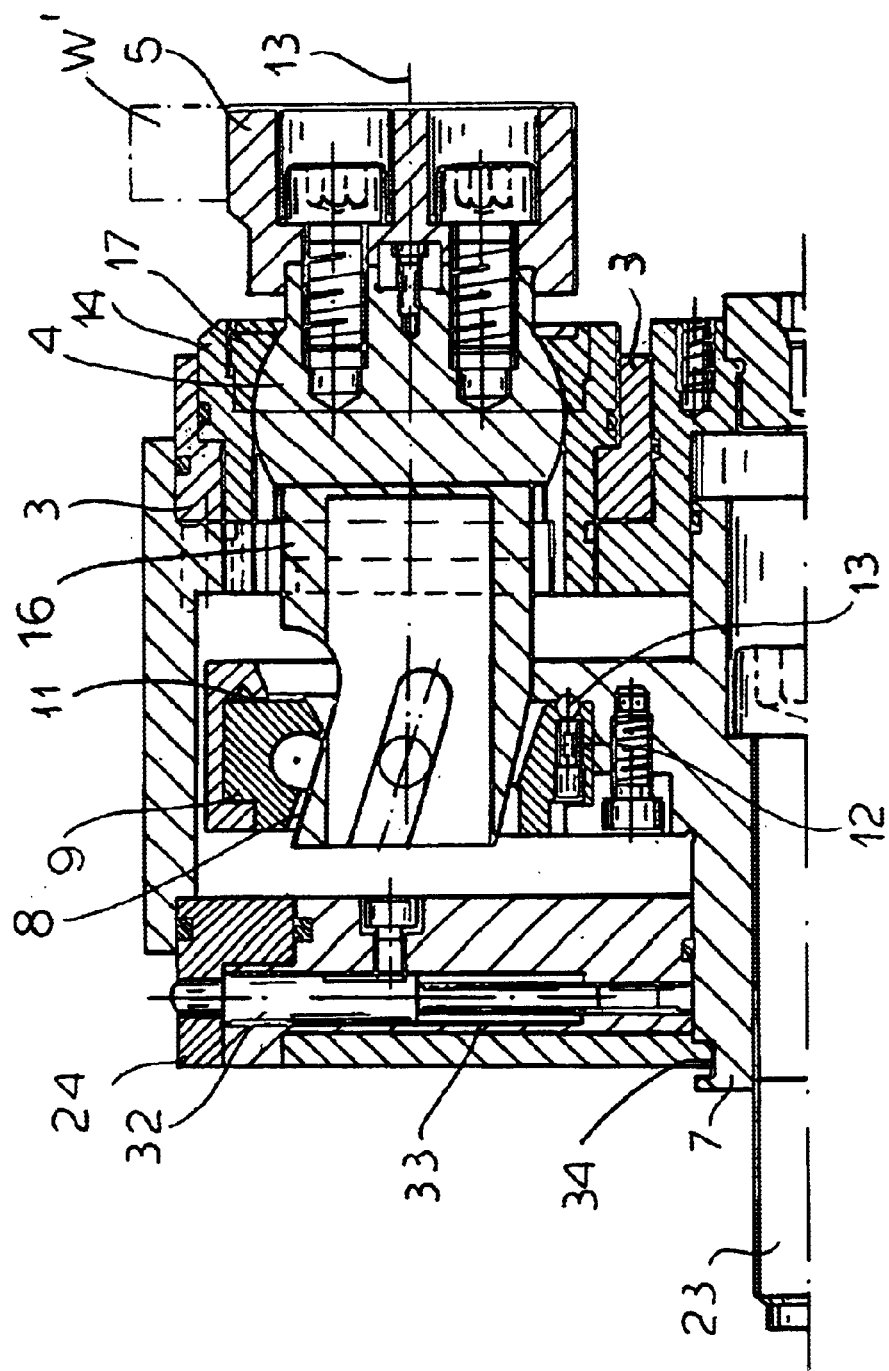
FIG. 6 is a view like an upper portion of FIG. 2 but showing the chuck set up for inside holding.

As seen in FIGS. 1 and 2 a chuck 1 according to the invention has a chuck body 2 centered on and rotatable about an axis 22 and adapted to be bolted to an unillustrated headstock. A front plate 3 carries three angularly equispaced ball bolts 4 each limitedly rockable in the plate 3 about a respective secantal axis 13 lying in a plane perpendicular to the axis 22. Rear ends of the ball bolts 4 are extended as stems 16 and front ends carry respective jaws 5 secured in place by screws 6 either for outside holding as shown in FIG. 2 or inside holding as shown in FIG. 6.

A piston 7 having a rearwardly directed sleeve stem 30 is axially displaceable in the body 2 and is secured to an unillustrated axially displaceable actuator by a bolt 23. This piston 7 carries a plurality of rings 9 with angled inner peripheries cooperating with angled cam faces 8 of the stems 16 of the respective ball bolts 4. The rings 9 can be rotated about respective axes 35 between 180° offset positions defined by a spring-loaded pin 12 carried in each ring 9 and engageable in either of two offset seats 10 and 11 formed in the piston 7.

Figure 5:
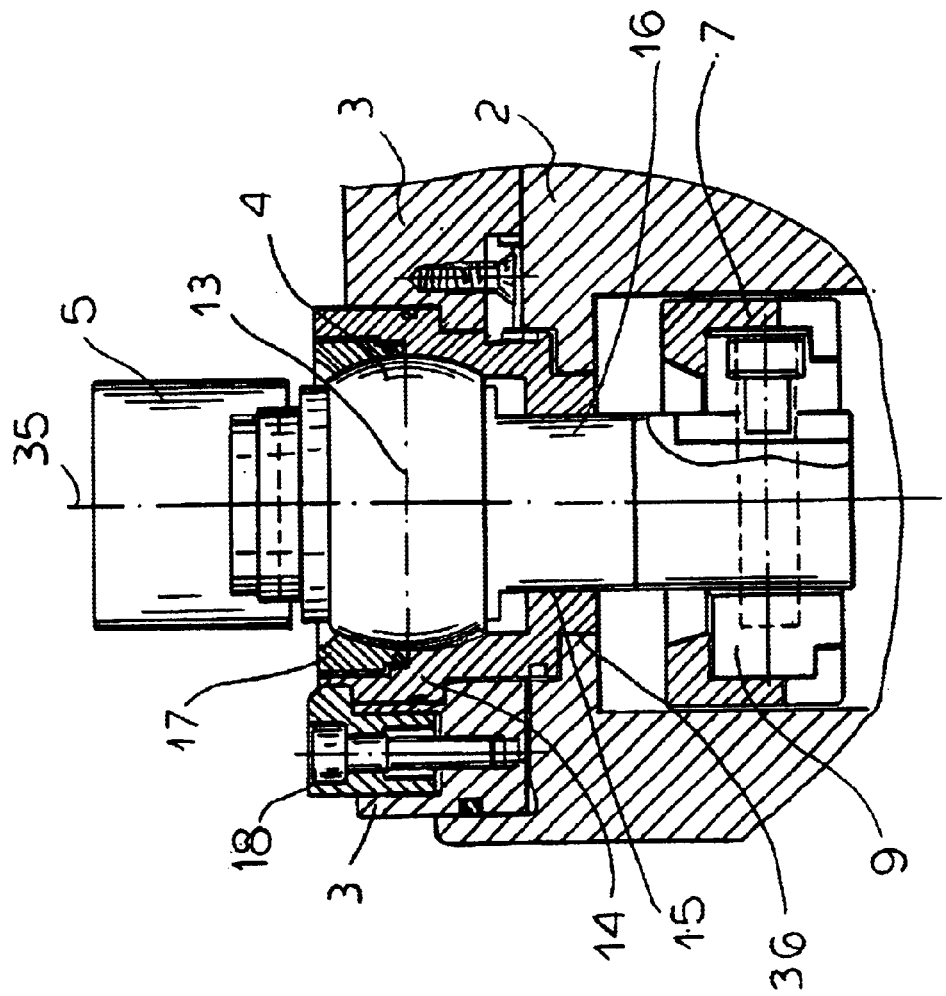
FIG. 5 is a section taken along line V—V of FIG. 1.

Each ball bolt 4 sits in a part-spherical seat 14 fitted to the plate 3 and is held therein by a retaining ring 17 that is externally threaded and screwed into the front end of the respective seat 14. As shown in FIG. 5 each stem 16 is braced laterally between flanks 15 of a slot formed in the base of the respective seat 14, and the seat 14 in turn bears against flanking side faces 36 of the body 2.

Releasable lugs 18 hold the seats 14 down in the plate 2, but can be pivoted out so that the entire seat 14 with the respective bolt 4 and retaining ring 17 can be pulled forward out of the plate 2, rotated through 180°, and set back in the plate 2, to be again secured in place by the lugs 18. This allows the jaws 5 to be reversed from an inwardly directed position as shown in FIG. 2 for outer holding of a workpiece W to an outwardly directed position for inner holding of a workpiece W' as shown in FIG. 6. The cam formations 8 are effective so that rearward retraction of the piston 7 when in the FIG. 2 outside-holding position causes the jaws 5 to rock radially inward, while in the FIG. 6 inside-holding position such retraction rocks the jaws 5 radially outward, through a small stroke of only tenths of a millimeter.

Figure 3:
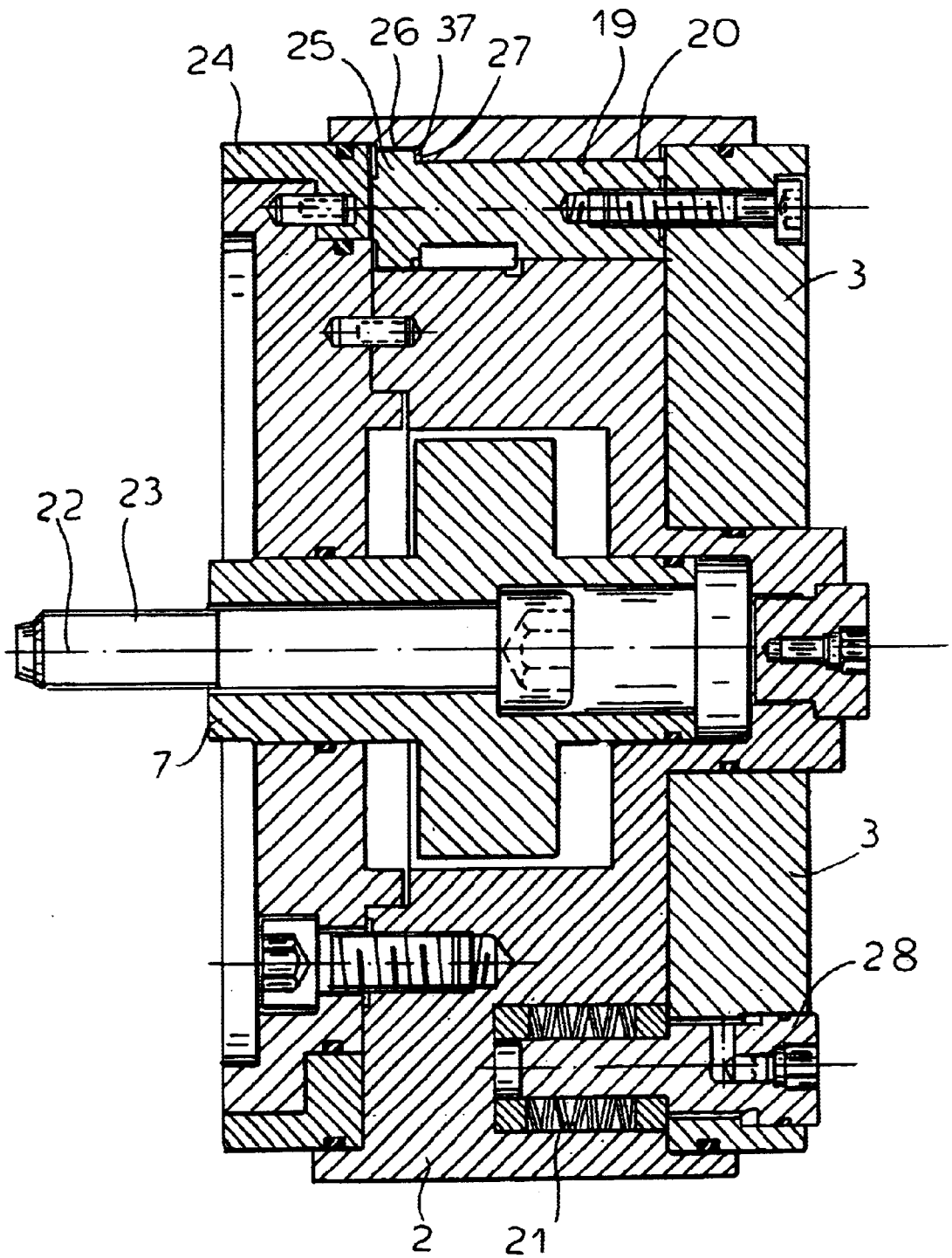
FIG. 3 is a section taken along line III—III of FIG. 1 with the chuck-jaw plate retracted

In accordance with the invention the plate 2 is provided with three angularly equispaced and rearwardly projecting posts 19 that are axially slidable in respective holes or passages 20 in the body 2 so that this plate 3 can move axially but not angularly with respect to the body 2. The rear ends of the posts 19 are each formed with a radially outwardly projecting ridge 26 engageable axially forward with a rearwardly directed annular end flank 27 of a groove 25 open radially inward into the respective passage 20. Thus engagement of a front face 37 of the ridge 26 with the rear face or flank 27 defines an outer position for the plate 2. Furthermore a spring formed by a stack of Belleville washers 21 is braced axially rearward against the body 2 and axially forward against a bolt 28 screwed into and extending rearward from the plate 3. Thus these springs 21 urge the plate 3 into the outer position shown in FIG. 3.

Figure 4:
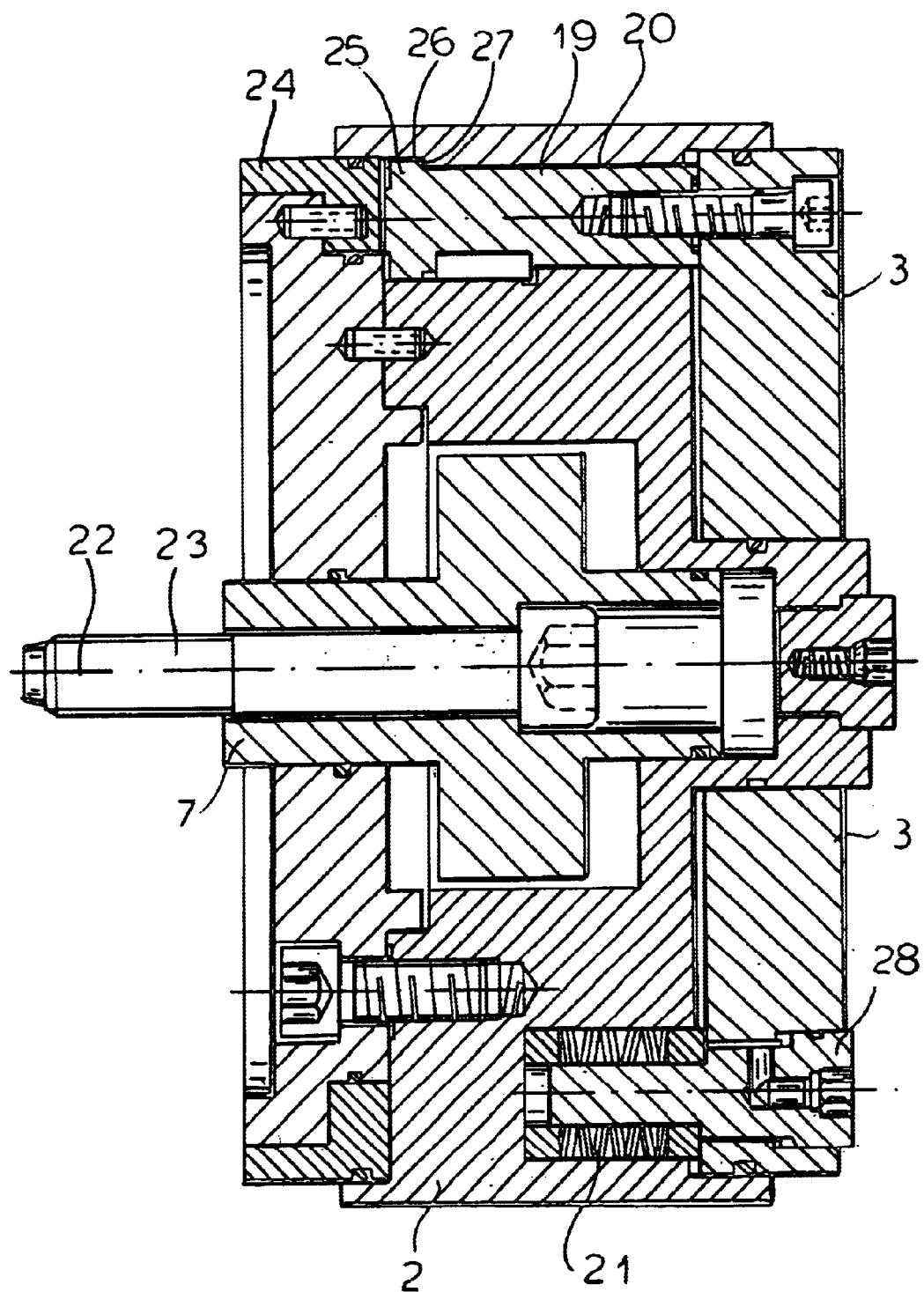
FIG. 4 is a view like FIG. 3 but with the chuck jaw plate in the outer position.
Figure 7:
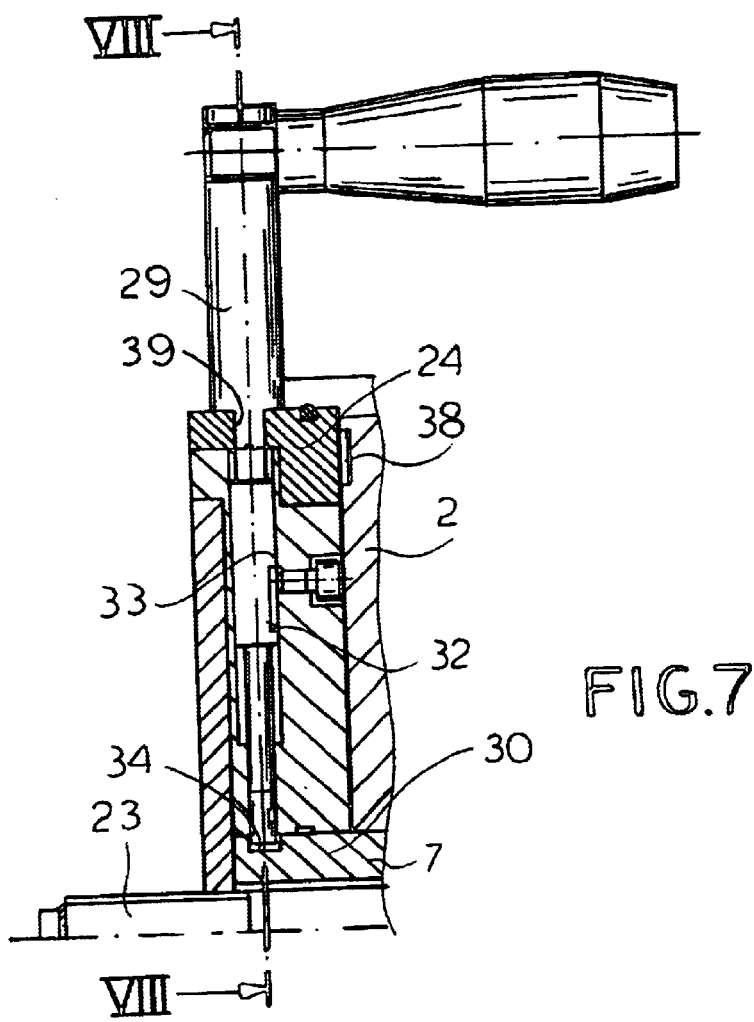
FIG. 7 is a detail view corresponding to a portion of FIG. 2 during adjustment of the chuck.

A cam ring 24 is angularly displaceable but axially nonmovable on the rear end of the body 2 and has cams 38 (FIG. 7 only) engageable with the rear ends of the posts 19. The cam ring 24 is displaceable angularly between a blocking position with the cams 38 bearing on the bolts 19 and preventing the plate 3 from moving rearward (to the left in FIGS. 2, 3, and 4) out of the outer FIG. 4 position and into a freeing position permitting such movement.

Figure 8:
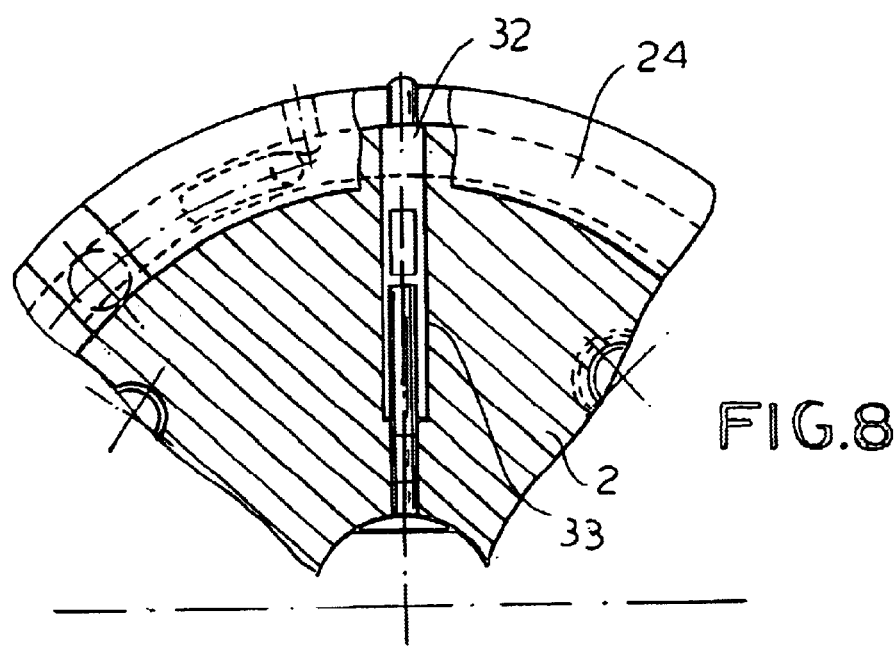
FIG. 8 is a section taken along line VIII—VIII of FIG. 7.

A radially displaceable latching pin 32 (FIGS. 6, 7, and 8) is radially displaceable in a radial bore 33 of the body 2 between an outer position engaged in a radial seat or bore 39 in the cam ring 24 and preventing it from moving angularly and an inner position clear of the bore 39 and engaged in a radially outwardly open groove 34 of the piston 7, thereby preventing this piston 7 from moving axially. A tool 29 is insertable into the bore 39 to move the latch pin 32 into the inner position and, when thus inserted, can be employed to shift the cam ring 24 angularly between its locking and unlocking positions.

When the cam 24 is in the freeing position with the cams 38 out of alignment with the rear ends of the posts 19 so that the plate 3 can move axially, rearward shifting of the piston 7 will first move the jaws 5 radially inward or outward, depending on whether they are set for inside or outside holding, and, once the axial component effective on the cam formations 8 is sufficient, will pull the plate 2 and jaws 5 axially inward, thereby for instance pulling the workpiece W back against an abutment 31 fixed on the body 2.

When the cam 24 is in the blocking position with the cams 38 aligned with the rear ends of the posts 19 so that the plate 3 cannot move axially rearward, rearward shifting of the piston 7 will move the jaws 5 radially, but will not axially shift them or the plate 3 at all. Thus depending on how the cam ring 24 is set, one has the advantage of radial clamping plus axial retraction of the workpiece or simple radial clamping.

We claim:

1. A chuck comprising:
   a chuck body rotatable about a main axis;
   a plate displaceable axially on the body between an outer position and an inner position;
   springs urging the plate into the outer position;
   a locking element on the body displaceable between a blocking position preventing displacement of the plate from the outer position into the inner position and a freeing position permitting such displacement;
   a plurality of jaw holders angularly spaced about the axis, fixed axially on the plate, and each having radially displaceable outer and inner ends;
   a piston axially displaceable in the body; and
   means including cam formations between the piston and the jaw-holder inner ends for radially displacing the jaw-holder outer ends on axial displacement of the piston.

2. The chuck defined in claim 1 wherein the jaw holders are ball bolts tippable about respective secantal axes lying in at least one plane extending perpendicular to the main axis, the cam formations including an angled face formed on each of the jaw-holder inner ends.

3. The chuck defined in claim 1 wherein the plate is provided with axially rearwardly directed posts having rear ends engageable with the locking element, the body formed with respective axially forwardly open passages slidably receiving the posts, whereby the posts and passages rotationally lock the plate and body together.

4. The chuck defined in claim 2 wherein the locking element is a ring rotatable about the main axis on the body and having respective cams engageable with the post rear ends.

5. The chuck defined in claim 4, further comprising
   a latch member displaceable between a latched position preventing angular movement of the ring and an unlatched position permitting such angular movement.

6. The chuck defined in claim 2 wherein the latching member engages the piston in the unlatched position and thereby prevents it from moving axially.

7. The chuck defined in claim 2 wherein each of the posts is formed with a transversely projecting formation having an axially forwardly directed face, each passage having a rearwardly directed face flatly engageable with the respective forwardly directed post face in the outer position of the plate.

8. The chuck defined in claim 7 wherein each passage is formed with a radially inwardly open groove having a front flank forming the respective rearwardly directed face and each post has a radially outwardly projecting ridge having the respective forwardly directed post face.

9. The chuck defined in claim 1, further comprising means including an axially displaceable abutment for varying a force the springs exert axially between the plate and the body.

10. The chuck defined in claim 9 wherein the abutment is a plurality of bolts threaded into the plate and bearing axially on the springs.

11. The chuck defined in claim 1, further comprising a respective seat fitted to the plate and pivotally supporting a center part of each bolt.

12. The chuck defined in claim 11 wherein each seat is provided with an externally threaded retaining ring holding the respective center part in the seat.

13. The chuck defined in claim 11 wherein each bolt bears angularly on faces of the respective seat.

14. The chuck defined in claim 13 wherein each seat bears angularly on respective faces of the plate.

15. The chuck defined in claim 11 wherein each seat is pivotal about a respective axis parallel to the main axis between two 180° offset positions.

16. The chuck defined in claim 15, further comprising means for releasably retaining each of the seats in its offset positions.

17. The chuck defined in claim 16 wherein the retaining means includes a spring-loaded pin in each seat and a pair of axially open pockets in the piston.

18. The chuck defined in claim 1 wherein the chuck body is provided adjacent the jaws with an axially forwardly directed abutment.

* * * * *